(12) United States Patent
Shenoy et al.

(10) Patent No.: US 12,254,074 B2
(45) Date of Patent: Mar. 18, 2025

(54) SYSTEM AND METHOD FOR MANAGING SECURITY AND ACCESS FOR MANAGEMENT CONTROLLER EMBEDDED DEVICES

(71) Applicant: Dell Products L.P., Round Rock, TX (US)

(72) Inventors: Ajay Shenoy, Bangalore (IN); Mahesh Babu Ramaiah, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 272 days.

(21) Appl. No.: 18/181,106

(22) Filed: Mar. 9, 2023

(65) Prior Publication Data
US 2024/0303314 A1    Sep. 12, 2024

(51) Int. Cl.
*G06F 21/00* (2013.01)
*G06F 21/33* (2013.01)
*G06F 21/64* (2013.01)

(52) U.S. Cl.
CPC .............. *G06F 21/33* (2013.01); *G06F 21/64* (2013.01)

(58) Field of Classification Search
CPC .................................. G06F 21/33; G06F 21/64
See application file for complete search history.

(56) References Cited

U.S. PATENT DOCUMENTS

| | | | |
|---|---|---|---|
| 2018/0041344 A1* | 2/2018 | Rahardjo | G06F 21/57 |
| 2022/0327243 A1* | 10/2022 | Singh | G06F 9/4411 |
| 2023/0134324 A1* | 5/2023 | Emerson | G06F 21/53 726/26 |

* cited by examiner

*Primary Examiner* — Ghazal B Shehni
(74) *Attorney, Agent, or Firm* — WOMBLE BOND DICKINSON (US) LLP

(57) ABSTRACT

Methods and systems for managing operation of data processing systems are disclosed. To manage operation of the data processing systems, the data processing systems may present unified communication and management systems. The unified communication and management systems may be used to manage the operation of any number of management controller embedded devices hosted by the data processing systems. The unified communication and management systems may be implemented using access to the management controller embedded devices.

20 Claims, 10 Drawing Sheets

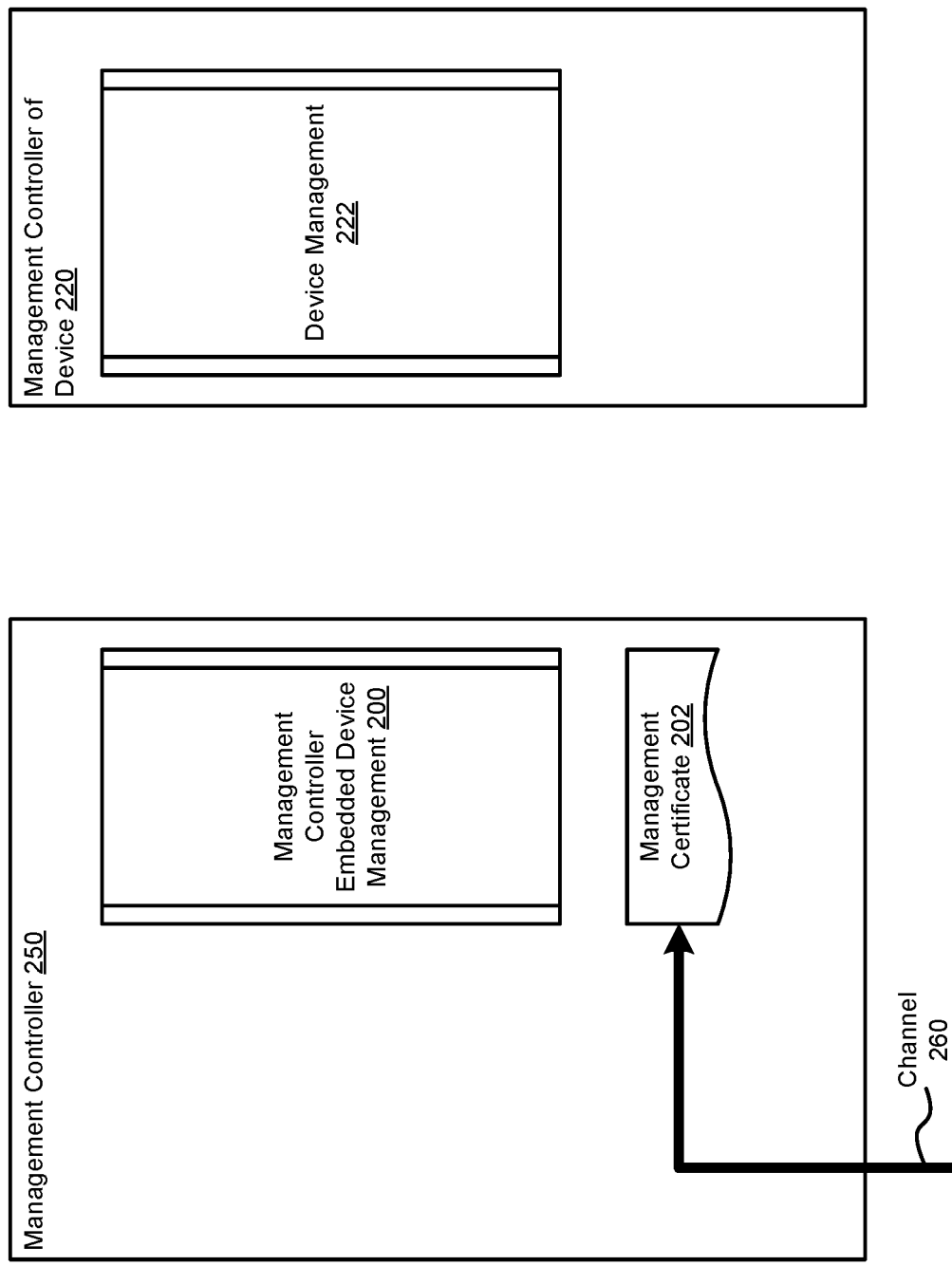

SYSTEM AND METHOD FOR MANAGING SECURITY AND ACCESS FOR MANAGEMENT CONTROLLER EMBEDDED DEVICES

FIELD

Embodiments disclosed herein relate generally to device management. More particularly, embodiments disclosed herein relate to systems and methods to manage the operation of data processing systems in a distributed system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2F show diagrams illustrating data flows in accordance with an embodiment.

DETAILED DESCRIPTION

Figure 1:
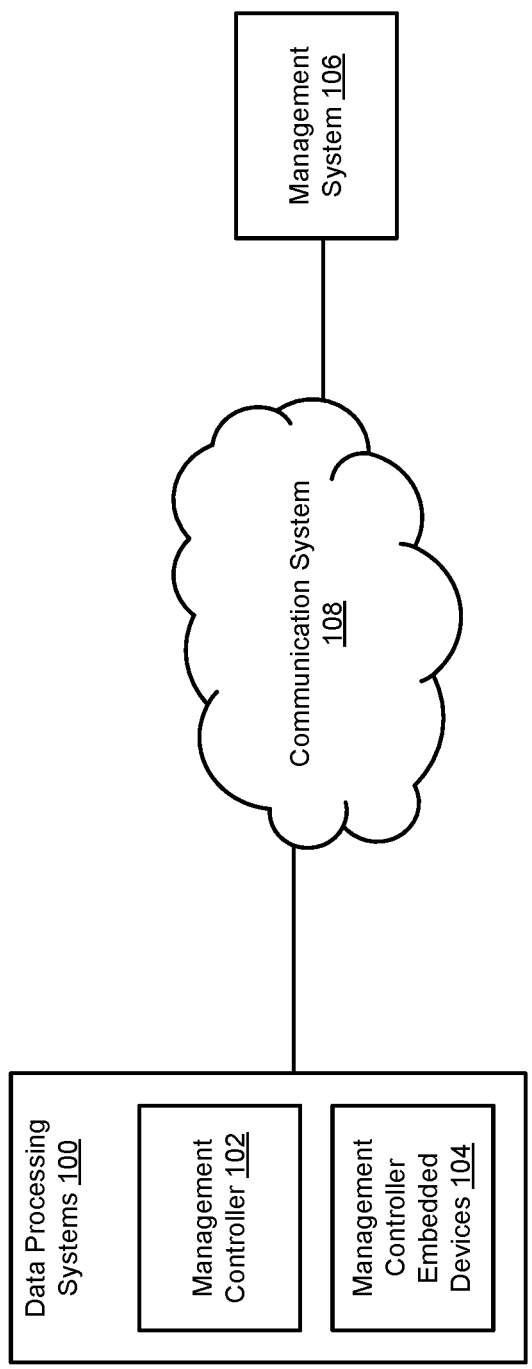
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. To manage the operation of data processing systems, a management system may obtain information regarding their operation and update their operation based on the obtained information.

The data processing systems, and some devices hosted by the data processing systems, may be implemented using management controller embedded devices. A management controller embedded device may be a device that is able to present itself to the management system in a distributed environment and participate in its management. To do so, the management controller embedded devices may implement network end points to which communications from the management system may be directed.

However, as the number of management controller embedded devices hosted by a data processing system grows over time, it may become progressively more difficult to manage the individual management controller embedded devices and incur additional management overhead. To manage the overhead and reduce complexity for managing data processing systems, the data processing systems may present a unified communication and management system through which multiple management controller embedded devices hosted by the data processing system may be managed.

The unified communication and management system may do so by gaining super root user access to the management controller embedded devices. The access may be obtained when the management controller embedded devices are added to a data processing system.

The super root user access may be obtained using either default credentials for access, or certificates usable to reset credentials. Once super root user access is obtained, the operation of the management controller embedded devices may be modified to limit access to the management controller embedded devices by other devices. Additionally, other types of access may be limited to reduce the likelihood of the management controller embedded devices being compromised.

Through the super root user access, the operation of the management controller embedded devices may be managed by a single device of a data processing system. Consequently, a management system may only need to interact with the single device of the data processing system rather than attempting to coordinate management of any number of management controller embedded devices hosted by a data processing system independently.

By doing so, any number of management controller embedded devices may be managed by a management system using a unified communication and management system. Thus, embodiments disclosed herein may address, among others, the technical challenge of limited computing resources for management. By consolidating management of multiple management controller embedded devices into a unified communication and management system, a management system may more efficiently analyze the condition of the data processing system and hosted management controller embedded devices. Additionally, the likelihood of compromise of the management controller embedded devices may be reduced through reduced visibility in a network environment, and reduced trust in entities that are remote to the management controller embedded devices. Thus, a data processing system in accordance with embodiments disclosed herein may also be less likely to be compromised.

In an embodiment, a method for managing management controller embedded devices (MCEDs) hosted by a data processing system is provided. The method may include identifying, by a management controller of the data processing system, presence of an unsecured MCED of the MCEDs;

gaining, by the management controller, user access to the unsecured MCED using default credentials for a type of the unsecured MCED; configuring, by the management controller and using the user access, super root user credentials for the unsecured MCED; securing, by the management controller and using super root user access to the unsecured MCED, the unsecured MCED to obtain a secured MCED; and obtaining, by the management controller and using the super root user credentials, a management certificate for the secured MCED usable to unsecure the secured MCED.

The method may also include storing, by the management controller, a copy of the management certificate in a management system remote to the data processing system.

The method may further include obtaining, by the management controller, a management operation for the secured MCED; and initiating, by the management controller and using the super root user credentials, performance of the management operation by the secured MCED.

The method may also include identifying, by the management controller, presence of a second secured MCED of the MCEDs; obtaining, by the management controller and from the management system, a second management certificate; unsecuring, by the management controller and using the second management certificate, the second secured MCED to obtain a second unsecured MCED; gaining, by the management controller, second user access to the second unsecured MCED using second default credentials for a type of the second unsecured MCED; configuring, by the management controller and using the second user access, second super root user credentials for the second unsecured MCED; securing, by the management controller and using second super root user access, the second unsecured MCED to obtain a second resecured MCED; and obtaining, by the management controller and using the second super root user credentials, a third management certificate for the second resecured MCED usable to unsecure the second resecured MCED.

The management certificate may include a service tag for the management controller and a service tag for the secured MCED.

The management certificate may indicate that the management controller has the super root user access to the secured MCED.

The management certificate may be cryptographically verifiable and may be signed by a trusted entity.

Securing the unsecured MCED may include disabling out-of-band management channels of the unsecured MCED; and retaining a management channel between the management controller and the unsecured MCED.

In an embodiment, a non-transitory media is provided. The non-transitory media may include instructions that when executed by a processor cause the computer-implemented method to be performed.

In an embodiment, a data processing system is provided. The data processing system (or a management controller hosted by the data processing system) may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer-implemented services, the system may include any number of data processing systems 100. Data processing systems 100 may provide the computer implemented services to users of data processing systems 100 and/or to other devices (not shown), and/or may cooperate with other devices that provide the computer implemented services. Different data processing systems may provide similar and/or different computer implemented services.

For example, any of data processing systems 100 may be members of cloud environments that provide the computer implemented services. The cloud environments may include any number of devices that provide computer implemented services.

To provide the computer-implemented services, data processing systems 100 may include various hardware components (e.g., processors, memory modules, storage devices, etc.) and host various software components (e.g., operating systems, application, startup managers such as basic input-output systems, etc.). These hardware and software components may provide the computer-implemented services via their operation.

To provide certain computer-implemented services, the hardware and/or software components may need to operate in predetermined manners. If the hardware and/or software components do not operate in the predetermined manners, then a data processing system may be unable to provide all, or a portion, of the computer-implemented services that it normally provides.

In general, embodiments disclosed herein may provide methods, systems, and/or devices for managing the operation of data processing systems 100. To manage the operation of data processing system 100, management system 106 may (i) collect information regarding the operation of a data processing system, and/or components thereof, and (ii) modify the operation of the data processing system, and/or components hereof By doing so, management system 106 may manage the operation of any number of data processing systems 100. Accordingly, the data processing systems may be more likely to successfully provide desired computer implemented services over time.

To collect information and modify the operation of the data processing system, management system 106 may communicate with data processing systems 100. However, due to the proliferation of devices with self-report and/or self-management capabilities, any of data processing systems 100 may include any number of management controller embedded devices 104.

A management controller embedded device may be a hardware device that may present itself to management systems for management purposes. For example, a management controller embedded device may include an embedded computing system (e.g., a management controller) that manages the operation of the devices. The embedded computer may include functionality to identify operation of various portions of the device, log information regarding its operation, modify configuration and/or hardware components of the devices, and/or perform other management functionalities. A management controller embedded device may be, for example, a graphics processing unit, a smart network interface card, a data processing unit, or any other types of devices that may include management capabilities.

The management capabilities may be implemented by, for example, presenting the management controller embedded devices to external systems (e.g., via in-band or out-of-band communications) as a separately manageable device from a host data processing system.

However, if management controller embedded devices 104 present themselves as being separate from a host data processing system, management of the data processing system and management controller embedded devices 104 may be more difficult. For example, to secure themselves, any of management controller embedded devices 104 may implement security models. The security models may facilitate discrimination of authorized entities (that may modify operation of data processing systems and/or management controller embedded devices) from unauthorized entities. Thus, in a system in which management controller embedded devices 104 may be managed by a host data processing system as well as remote management systems, the management controller embedded devices 104 may need to implement more complicated security models. For example, the security models may require multiple user access accounts as well as different levels of access to functions of management controller embedded devices 104. Otherwise, unauthorized entities may manage operation of management controller embedded devices 104 to their detriment.

To reduce the complexity of managing data processing system and management controller embedded devices 104, a data processing system in accordance with an embodiment may implement a single management communication model for all hosted management controller embedded devices.

To implement the management communication model, each of data processing systems 100 may host an instance of management controller 102. Management controller 102 may (i) manage communications between management controller embedded devices 104, a host data processing system, and management system 106, (ii) monitor the operation of the management controller embedded devices, (iii) provide information regarding the operation of management controller embedded devices 104 to management system 106, (v) obtain management operations from management system 106 that are responsive to the information, and (iv) initiate performance of the management operations.

To manage the communications between management controller embedded devices 104 and other entities, management controller 102 may establish super root user access to the management controller embedded devices 104. Through the super root user access, management controller 102 may configure the management controller embedded devices 104 to limit presentation in a network environment (e.g., by closing out-of-band communication channels except those to management controller 102), may secure other user access to the management controller embedded devices 104, and/or may otherwise enforce security standards on management controller embedded devices 104.

To establish the super root user access, management controller 102 may use default credentials (e.g., set at a factory) for unsecured management controller embedded devices 104. When user access is obtained using the default credentials, the credentials for super root user access may be set by management controller 102 and the device may be secured (e.g., by modifying the default credentials, disabling them, etc.).

If a management controller embedded device is already secured, then management controller 102 may utilize a management certificate for the management controller embedded device to obtain super root access. When super root user credentials for a management controller embedded device are set, the super root user credentials may be utilized to generate a management certificate. The management certificate may be a cryptographically secured data structure signed using a key pair of a trusted entity (e.g., of the entity that established the super root user credentials using the default credentials). The management certificate may be used to unsecure the secured management controller embedded device. For example, upon ingestion or use, the management certificate may cause the management controller embedded device to reset the super user access credentials (e.g., presuming that the management certificate can be verified), and/or other aspects regarding the configuration of the management controller embedded device may be modified to enable management controller 102 to obtain control over the management controller embedded device.

However, in some scenarios, an unsecured management controller embedded device may not have publicly available default credentials for use (e.g., if not established at the factory). In such scenarios, a factory certificate may be established (e.g., at the factory). The factory certificate may include both access credentials for the management controller embedded device, or other types of data structures (e.g., secure tokens), usable to gain access to the management controller embedded device. Once access is obtained, a similar process may be performed to establish super root user access to the device. Management controller 102 may retrieve the data structures from a vault or other type of system.

Once access to management controller embedded devices 104 is obtained by management controller 102, management controller 102 may serve as the access point to management controller embedded devices 104 for management system 106. To modify operation of any of management controller embedded devices 104, management system 106 may send a request to management controller 102, which may pass the request on to the target management controller embedded device. Management controller 102 and/or the target management controller embedded device may perform various security actions such as, for example, verifying that the request is signed by a trusted entity. Additionally, the management controller embedded device may verify that the request is received from management controller 102 and/or verify that a communication in which the request is received is signed by management controller 102.

Management system 106 may manage data processing systems 100 (e.g., the processing complexes of the data processing systems), and the hosted management controller embedded devices 104. To do so, management system 106 may obtain information regarding operation of management controller embedded devices 104 from management controller 102 to select management operations to be performed to manage operation of the data processing systems, and components thereof.

Figure 3A:
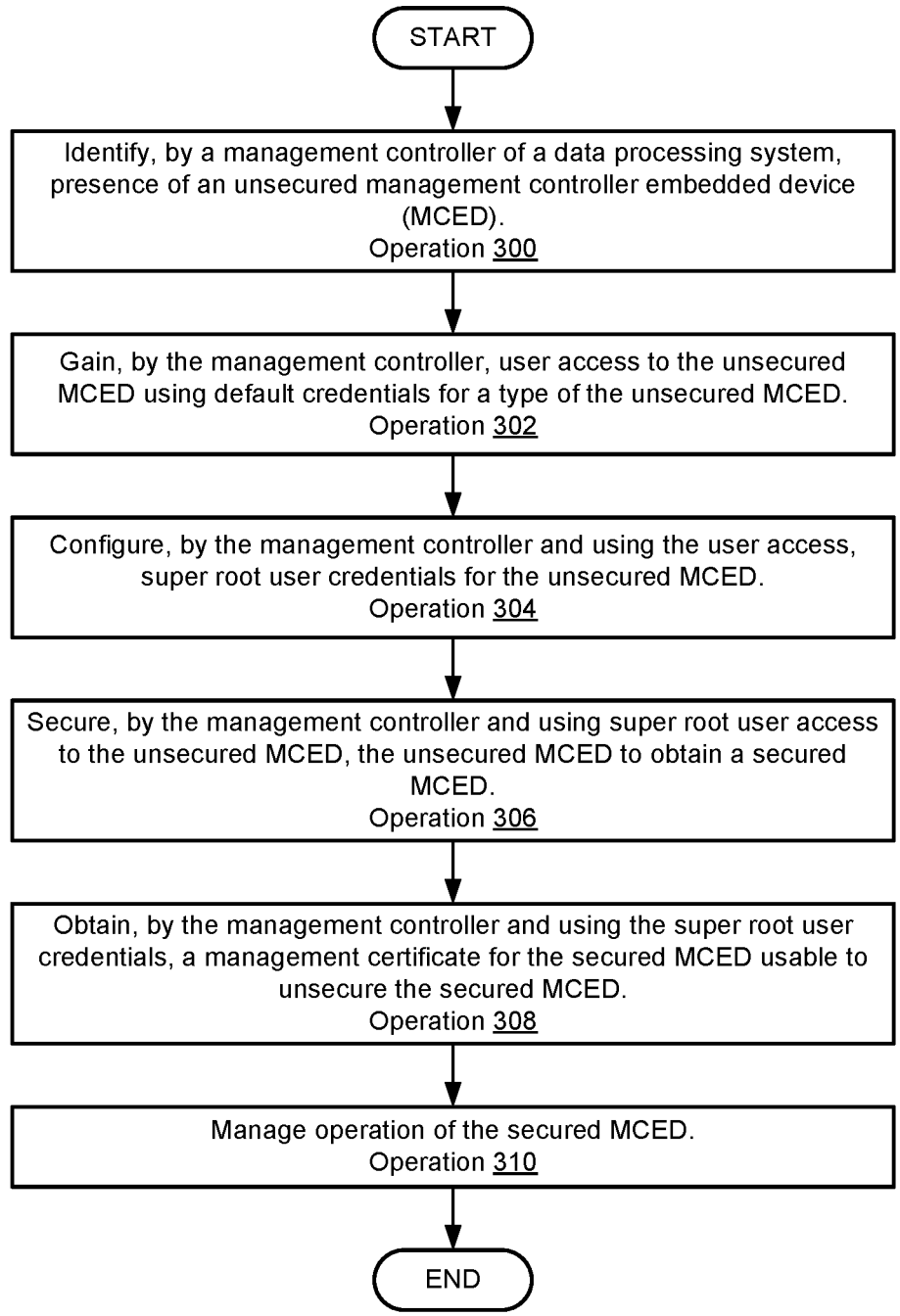
FIGS. 3A-3B show flow diagrams illustrating methods of managing operation of data processing systems in accordance with an embodiment.
Figure 3B:
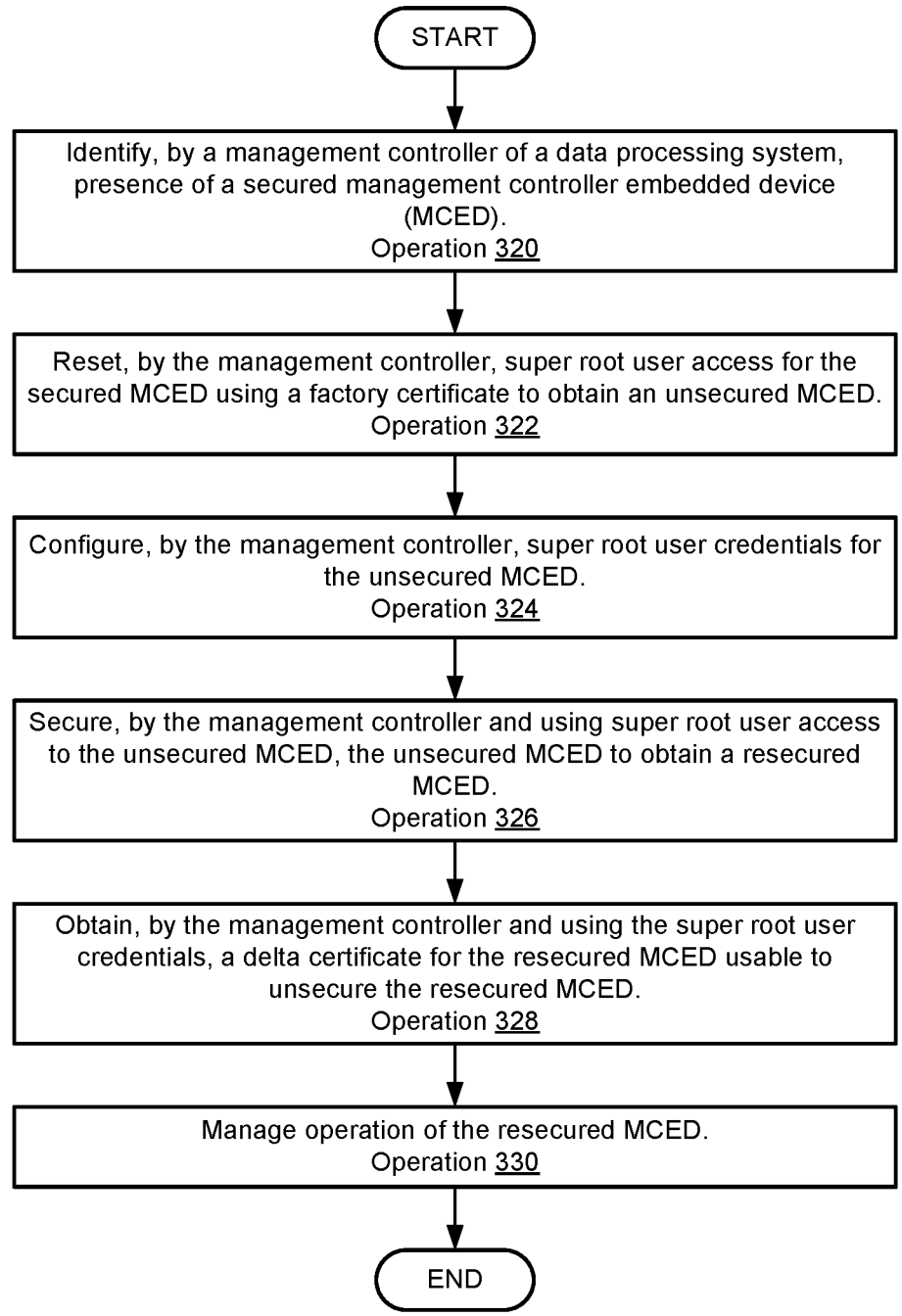

When providing their functionality, any of data processing system 100 and management system 106 may perform all, or a portion, of the methods illustrated in FIGS. 3A-3B.

Any of data processing systems 100 and/or management system 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Management system 106 may be implemented with multiple computing devices. The computing devices of management system 106 may cooperatively perform processes for managing the operation of data processing systems 100. The computing devices of management system 106 may perform similar and/or different functions.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows implemented by and data structures used by a system over time in accordance with an embodiment are shown in FIGS. 2A-2F. In FIGS. 2A-2E, example scenarios in accordance with an embodiment are presented in which a management controller embedded device is configured with a factory default credential for user access. In contrast, in FIG. 2F, example scenarios in accordance with an embodiment are presented in which a management controller is not configured with factory default credentials for user access.

Figure 2A:
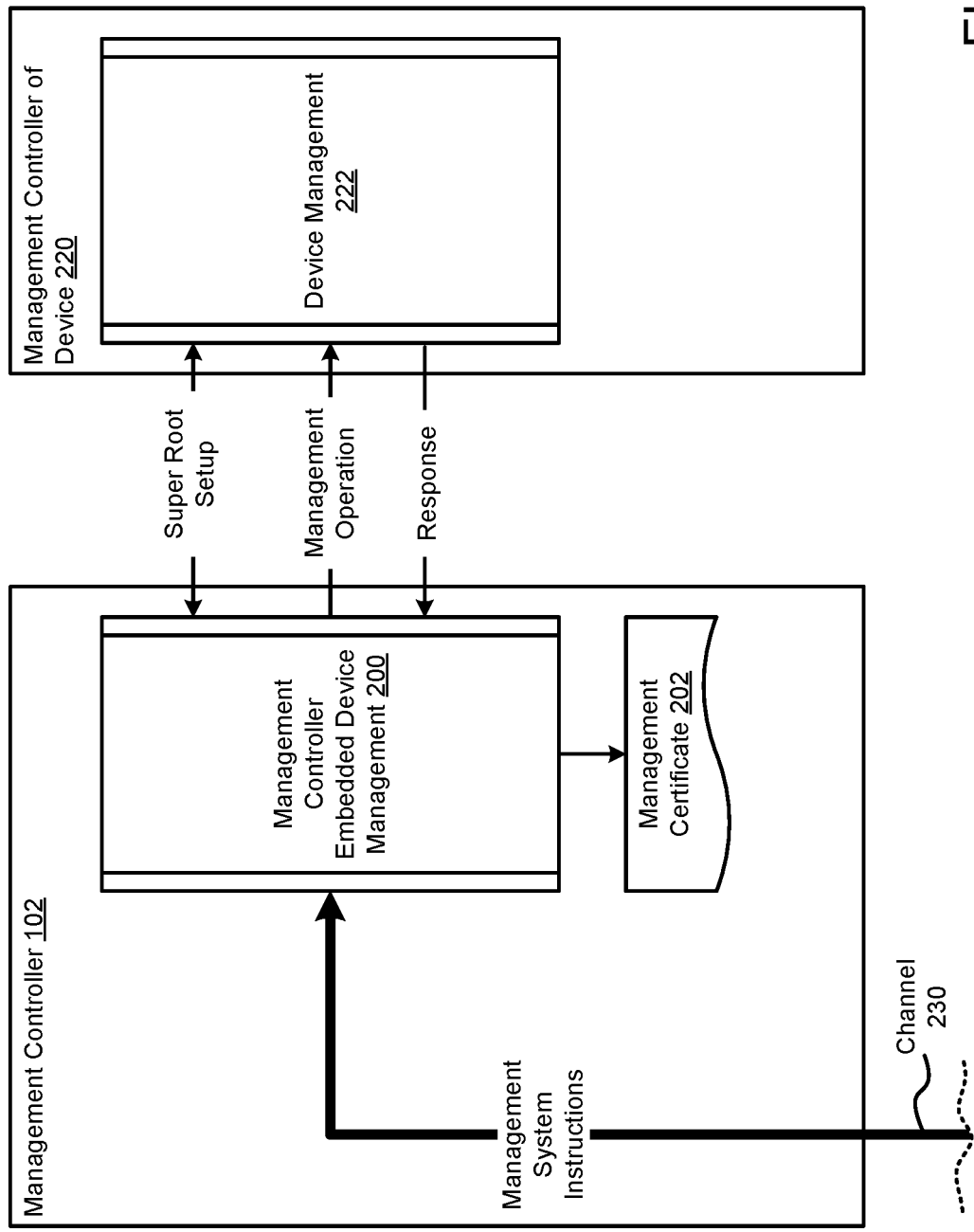

Turning to FIG. 2A, a first data flow diagram illustrating data flows, data processing, and/or other operations that may be performed by the system of FIG. 1 in accordance with an embodiment is shown.

Consider a scenario in which a data processing system hosts management controller 102 and a device (e.g., a graphics processing unit) which includes management controller of device 220. To manage the data processing system and management controller of device 220, management controller 102 may establish super root access to management controller of device 220. Management controller 102 may do so, for example, in response to management system instructions 230 obtained via channel 230 (e.g., between management controller 102 and management system 106).

To do so, management controller embedded device management 200 process may be performed. During the process, default access credentials may be provided to device management 222 process. When provided, management controller of device 220 may attempt to validate the credentials (e.g., passwords, login information, etc.) and, if validated, allow for a super root setup process to be performed. During the super root setup process, management controller 102 may (i) establish super root user access (e.g., by establishing corresponding credentials), (ii) limit presentation of the device to other entities (e.g., by shutting down out of band interfaces and/or device discovery processes), (iii) restrict access to management controller of device 220 (e.g., by modifying credentials for and/or disabling various accounts), and (iv) generate management certificate 202.

Management certificate 202 may be generated by (i) obtaining a service tag (or other identifier) for management controller 102, (ii) obtaining a service tag (or other identifier) for management controller of device 220, (iii) generating a payload using the service tags, and (iv) signing the payload using a key pair, a secret known to management controller of device 220, or other type of cryptographic key. For example, management controller 102 may generate the payload, provide the payload to management controller of device 220 which may sign it using the cryptographic key, and provide the signed payload to management controller 102 as management certificate 202.

Once super root access is obtained, management controller 102 may send various management operations to management controller of device 220 and receive various responses. For example, the management operations may be modifications to the configuration or operation of management controller of device 220 as specified by management system 106. The responses may include acknowledgements, telemetry data, and/or other types of information. Management controller 102 may relay any of the information to management system 106 thereby allowing management system 106 to manage both the data processing system hosting management controller 102 as well as the device that hosts management controller of device 220.

Figure 2B:
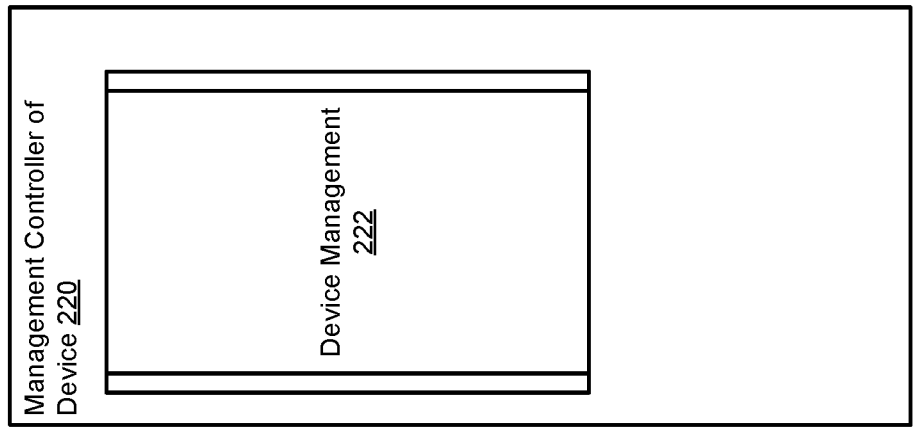
Figure 2B:
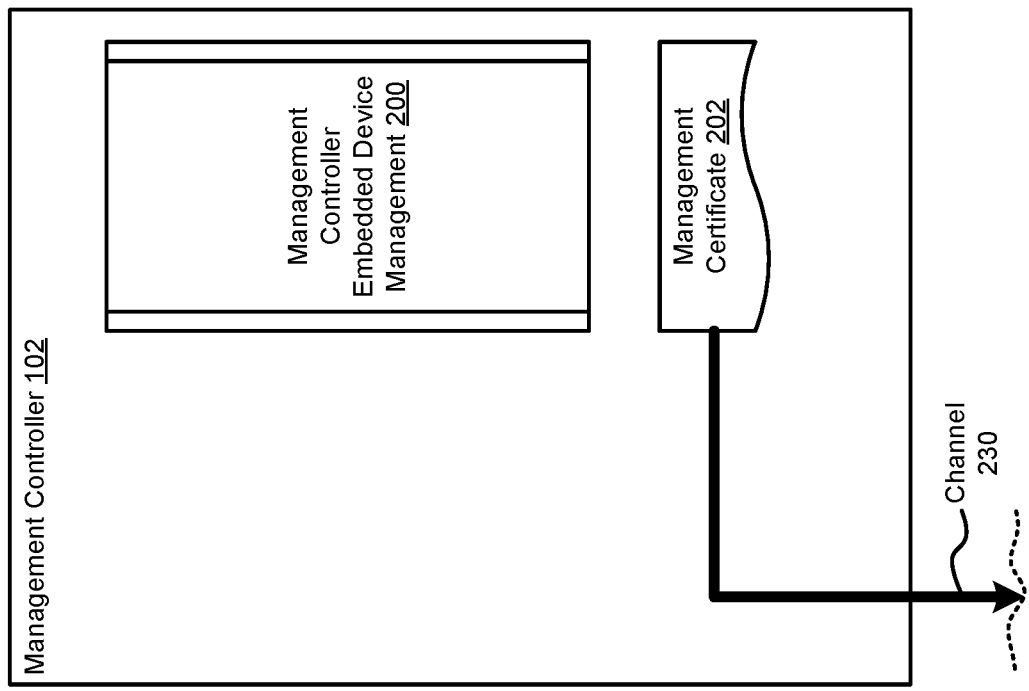

Turning to FIG. 2B, a second data flow diagram illustrating data flows, data processing, and/or other operations that may be performed by the system of FIG. 1 in accordance with an embodiment is shown.

Continuing with the discussion of the scenario, once super root user access is obtained the default credentials may be disabled, as discussed above. Consequently, if the device is migrated to a different data processing system where a different management controller may be tasked with managing the device, the management controller may not be able to obtain super root user access using the default credentials.

To facilitate use of the device, management certificate 202 may be exported from management controller 102. For example, a copy of management certificate 202 may be stored in a cloud, a console, management system 106 (or a designee), and/or other type of independent device.

Turning to FIG. 2C, a third data flow diagram illustrating data flows, data processing, and/or other operations that may be performed by the system of FIG. 1 in accordance with an embodiment is shown.

Continuing with the discussion of the scenario, once the device is migrated, management controller 250 may be tasked with facilitating access to the device. To do so, management controller 250 may import management certificate 202 via channel 260 (e.g., another channel between management system 106 and management controller 250).

Once received, the copy of management certificate 202 may be used to gain super root user access to management controller of device 220.

Figure 2D:
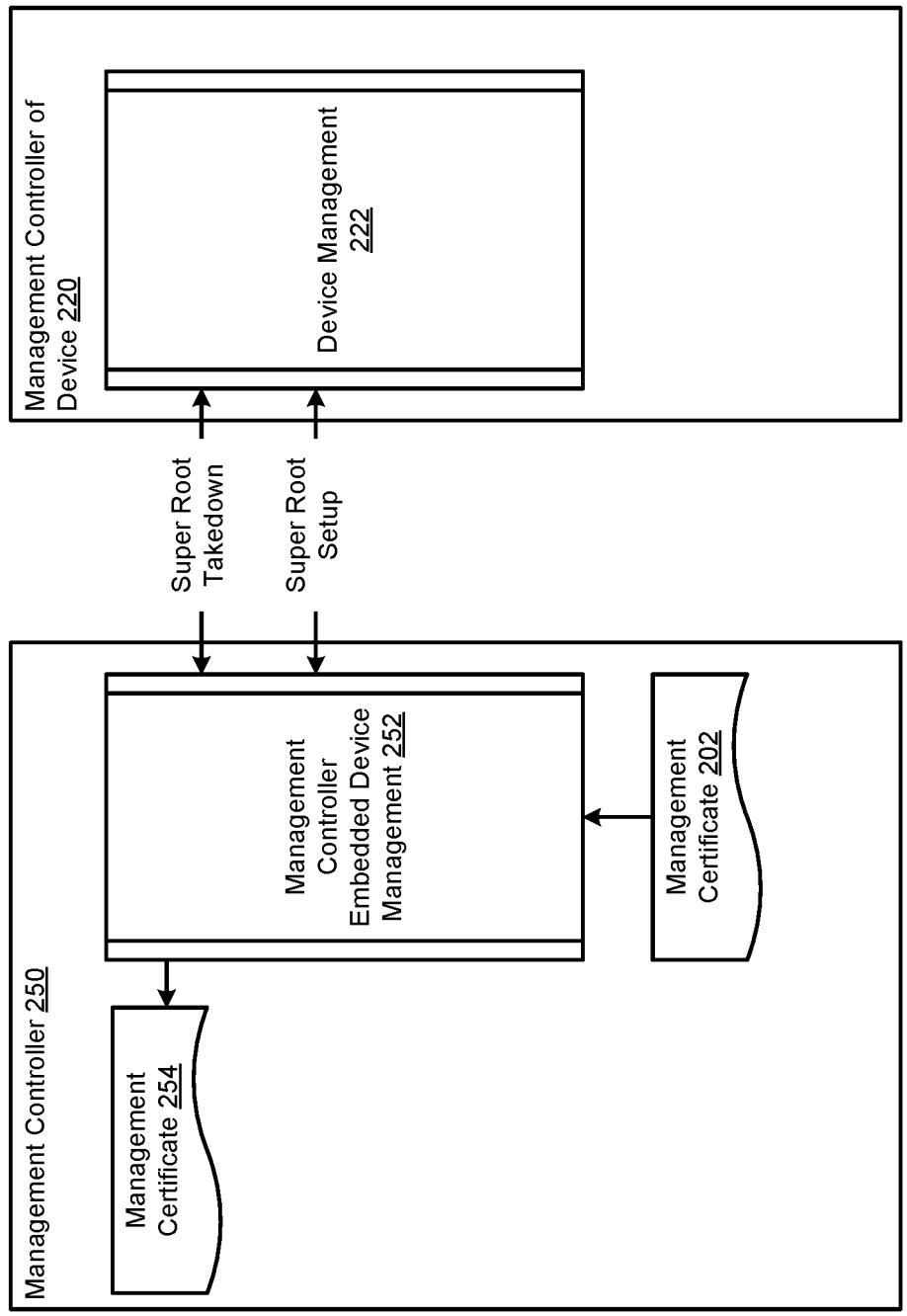

Turning to FIG. 2D, a fourth data flow diagram illustrating data flows, data processing, and/or other operations that may be performed by the system of FIG. 1 in accordance with an embodiment is shown.

Continuing with the discussion of the scenario, management controller 250 may perform management controller embedded device management 252 process to obtain super root user access to management controller of device 220. To do so, management certificate 202 may be provided to device management 222 process as part of a super root takedown process. During the super root takedown, management certificate 220 may be provided to device management 222 process and may be attempted to be validated. Because management certificate 202 was signed using a cryptographic key known to management controller of device 220, management certificate 202 may be identified as being valid.

Once validated, device management 222 process may reset the credentials for the super root user thereby allowing management controller 250 to obtain super root user access (e.g., the reset credentials may be known to management controller 250 and/or provided as part of super root takedown).

Once super root takedown is complete, a super root setup process may be performed similarly to that discussed with respect to FIG. 2A, thereby resulting in the generation of management certificate 254 (which may be usable to perform a similar super root takedown process in the future).

Figure 2E:
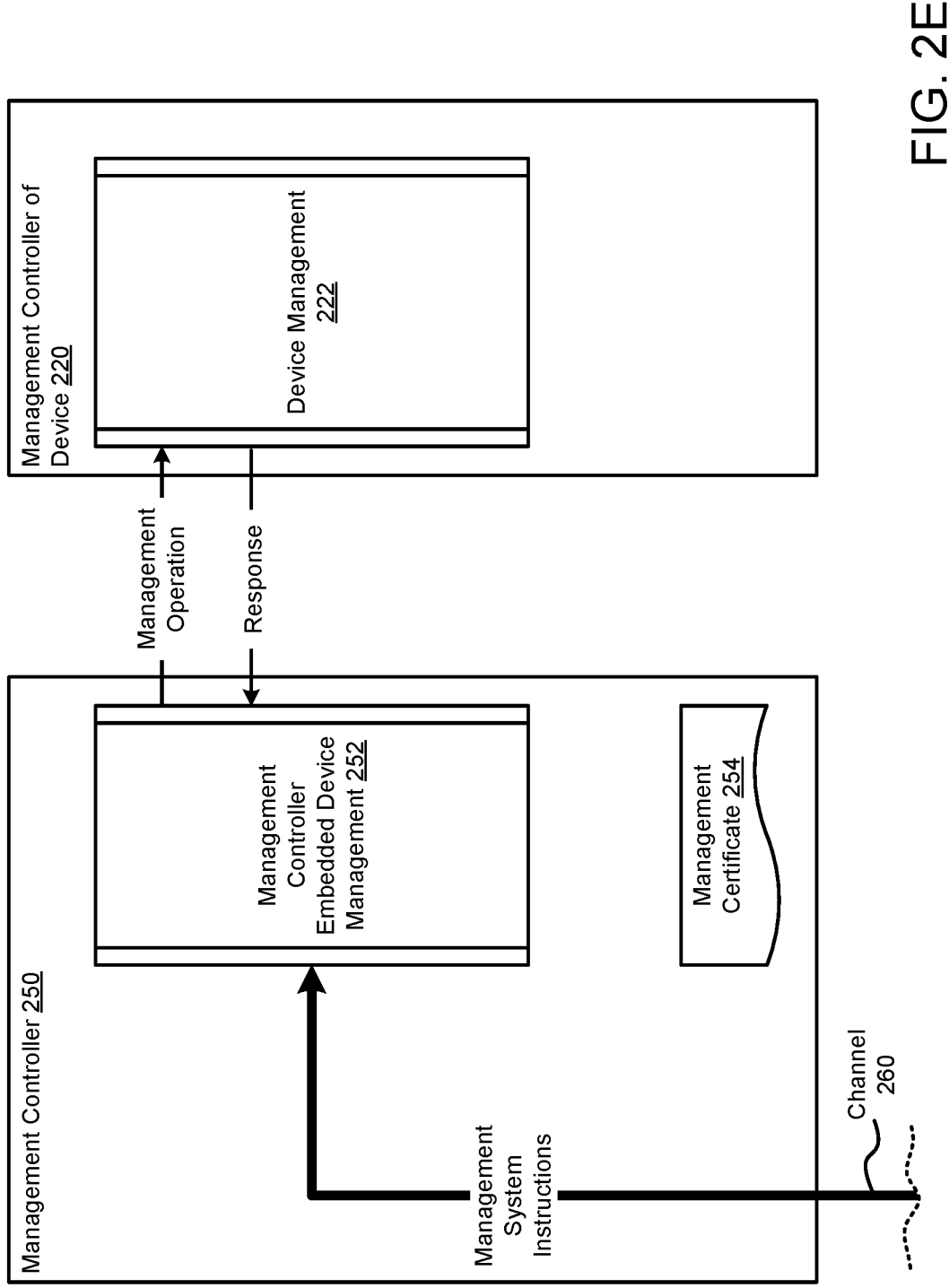

Turning to FIG. 2E, a fifth data flow diagram illustrating data flows, data processing, and/or other operations that may be performed by the system of FIG. 1 in accordance with an embodiment is shown.

Continuing with the discussion of the scenario, once super root user access is obtained by management controller 250, management controller 250 may receive various management system instructions via channel 260. The management system instructions may prompt management controller 250 to instruct management controller of device 220 to instruct management controller of device 220 to perform corresponding management operations, and may receive corresponding responses.

Thus, as shown in FIGS. 2A-2E, embodiments disclosed herein may facilitate unified management of both host data processing systems and devices hosted thereby using a single, unified interface to the host data processing systems. Consequently, management of data processing systems may be reduced in complexity (e.g., fewer credentials needed by management system 106), the overhead for management may be reduced, and/or other benefits may be obtained.

However, in an embodiment, management controllers of devices may not have default credentials usable to obtain super root user access (e.g., at least when shipped from a factory).

Figure 2F:
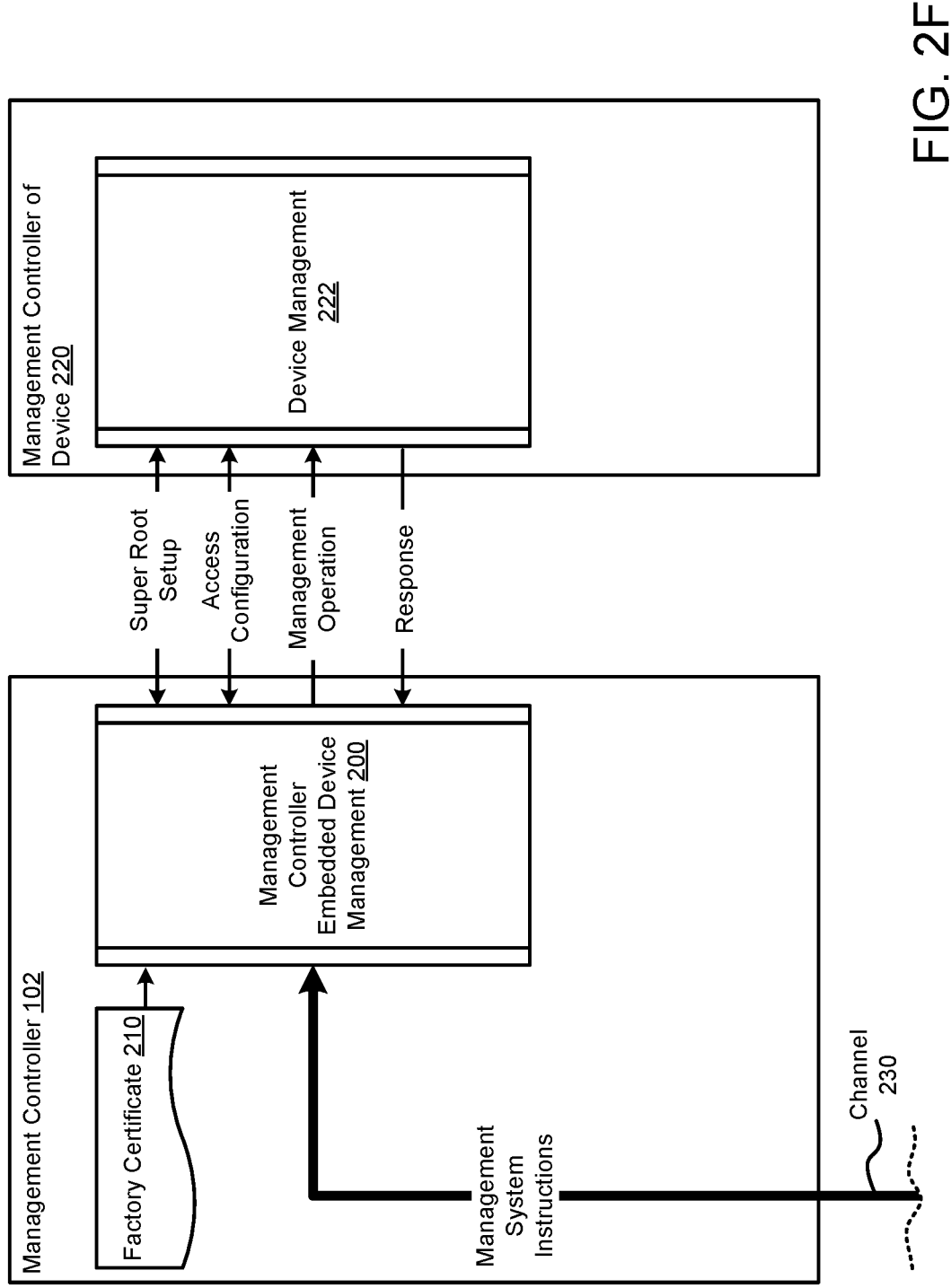

Turning to FIG. 2F, a sixth data flow diagram illustrating data flows, data processing, and/or other operations that may be performed by the system of FIG. 1 in accordance with an embodiment is shown.

Now consider a second scenario in which, in a factory environment, a management controller is configured with a set of credentials. In the factory environment, this process may be performed as described with respect to FIGS. 2A-2E. However, when shipped, management controller of device 220 may secured with credentials and factory certificate 210 for resetting the credentials may be established. For example, factory certificate 210 may include information regarding the device (e.g., an inventory) hosting the management controller, and may be signed using a cryptographic key known to management controller of device 220.

Accordingly, in this scenario, to gain access to management controller of device 220, when management controller device management 200 process is performed, factory certificate 210 may be used to perform a super root setup process. During the process, factory certificate 210 may be (i) obtained (e.g., by receiving it from a management system, the factory, etc.), and (ii) provided to device management 222 process. The inventory from factory certificate 210 may be used, prior to performing the super root setup, to proactively verify that factory certificate 210 is usable to gain access to management controller of device 220.

Once super root user access is obtained, an access configuration process may be performed to (i) disable other forms of access to the device (e.g., by disabling accounts, resetting credentials, etc.), (ii) establish new credentials, and/or perform other actions to manage future access to management controller of device 220.

Once complete, as discussed with respect to FIG. 2A, management system instructions may be used to select management operations to be performed by the management controller of device 220, and to obtain corresponding responses.

While not shown, much like the management certificate, credentials for accessing the management controller may be exported to the management system for future use. Consequently, if the device is moved to a new host data processing system, then the exported credentials may be used to facilitate access by a different management controller of the new host data processing system to management controller of device 220.

For example, when management controller 102 gains super root user access to management controller of device 220, a delta certificate with the credentials may be generated and exported. The delta certificate may include, for example, an inventory like the factory certificate and/or the credentials for accessing management controller or device 220 as set by management controller 102. Thus, once established, access credentials for management controller of device 220 may be maintained in management system 106, or another entity.

In an embodiment, any of management controller 102 and/or management controller of device 220 are implemented using a hardware device including circuitry. The hardware device may be, for example, a digital signal processor, a field programmable gate array, or an application specific integrated circuit. The circuitry may be adapted to cause the hardware device to perform the functionality of management controller 102 and/or management controller of device 220 as discussed herein. Management controller 102 and/or management controller of device 220 may be implemented using other types of hardware devices without departing embodiment disclosed herein.

In an embodiment, any of management controller 102 and/or management controller of device 220 are implemented using a processor adapted to execute computing code stored on a persistent storage that when executed by the processor performs the functionality of management controller 102 and/or management controller of device 220 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, any of management controller 102 and/or management controller of device 220 include storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures discussed herein. Any of these data structures may be implemented using, for example, lists, tables databases, linked lists, unstructured data, and/or other types of data structures.

As discussed above, the components of FIG. 1 may perform various methods to manage operation of data processing systems. FIGS. 3A-3B illustrate methods that may be performed by the components of the system of FIG. 1. In the diagram discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing MCEDs in accordance with an embodiment is shown. The method may be performed by any of data processing systems 100, management controller 102, management system 106, and/or other components of the system shown in FIG. 1.

Prior to operation 300, a MCED may have been programmed or otherwise configured with a default set of credentials for user access.

At operation 300, presence of an unsecured MCED in a data processing system is identified. The presence may be identified by a management controller of the data processing system. The presence may be identified by (i) performing a discovery process for devices hosted by the data processing system, (ii) by receiving information regarding the presence from the host data processing system, (iii) by reading information regarding the presence from the host data processing system from storage (e.g., such as a data structure which includes information regarding devices hosted by the data processing system), and/or via other methods.

The discovery process may include, for example, attempting to communicate with other devices hosted by the data processing system via one or more communication channels (e.g., such as a data bus through which devices of the data processing system may communicate with one another, and/or via specialized management communication channels such as out of band channels).

At operation 302, user access to the unsecured MCED is gained using the default credentials for the type of the unsecured MCED. The user access may be obtained by (i) obtaining the default credentials (e.g., by reading them from storage, obtaining them from another device, and/or via other processes), (ii) providing the default credentials to the unsecured MCED as part of an attempt to gain access to the unsecured MCED, and (iii) providing, by the unsecured MCED and responsive to the default credentials, the user access. The user access may allow the management controller to, for example, activate functionalities of the unsecured MCED, reconfigure operation of the unsecured MCED, modify user credentials, obtain information from the unsecured MCED (e.g., telemetry data, operational status, etc.), and/or initiate performance of other types of management actions.

At operation 304, super root user credentials for the unsecured MCED are configured. The management controller may configure the super root user credentials using the user access. The super root user credentials may be configured by (i) invoking a configuration function of the unsecured MCED and (ii) specifying, to the unsecured MCED, the super root user credentials. The super root user credentials may include, for example, an identifier of the super root user, access credentials such as passwords, and/or other types of information that may allow the unsecured MCED to discriminate entities entitled to super root user access from other entities.

At operation 306, the unsecured MCED is secured to obtain a secured MCED. The unsecured MCED may be secured by the management controller and using the super root user access. For example, some functionalities of the unsecured MCED may be restricted to different types of users. These functionalities may include, for example, presentation of the MCED in a network environment, user account modification, etc. The unsecured MCED may be secured by (i) invoking configuration functionality of the MCED using the super root user access to modify presentation of the MCED in the network environment such that the MCED is only visible to the management controller (e.g., may stop presenting itself as a different endpoint and/or may stop advertising the endpoint), (ii) invoking configuration functionality of the MCED to limit access to the MCED except for the super root user access, and/or perform other configurations to limit access to the MCED.

At operation 308, a management certificate for the secured MCED is obtained. The management certificate may be usable to unsecure the secured MCED. For example, the management certificate may allow for a non-super root user to reset the credentials for the super root user access. Consequently, a different entity gain super root user access to the secured MCED using the reset credentials (e.g., identifier, password, etc.).

The management certificate may be obtained by (i) obtaining a payload and (ii) initiating signing of the payload by the secured MCED (e.g., through invocation of a functionality of the secured MCED). The signed payload may be the management certificate.

The management certificate may be exported from the management controller for storage in other locations (e.g., a cloud storage, management system 106, a repository/locker, etc.). Consequently, other entities may retrieve the copy of the management certificate and use the management certificate to gain super root user access to the secured MCED.

At operation 310, operation of the secured MCED is managed. The operation may be managed by (i) obtaining management operations for the secured MCED (e.g., from a management system that may manage the host data processing system, the secured MCED, and/or other devices), (ii) identifying that the management operations are for the secured MCED and/or validating the management operations (e.g., the management controller may implement a security model through which it may validate operations for the secured MCED prior to issuing them to the secured MCED) by discriminating them from other management operations directed to the host data processing system and/or other devices (e.g., the management controller may serve as a unified management entity for the data processing system and hosted devices), (iii) issuing the management operations to the secured MCED, (iv) obtaining information from the secured MCED such as telemetry data, communications, etc., (v) providing all, a portion, or other information derived from the information to other entities, and/or performing other actions to facilitate management of the secured MCED.

The management operations may, for example, cause the secured MCED to modify its operation, provide information, etc.

When issuing the management operations to the MCED, the management controller may do so using the super root user access. For example, the management controller may sign the management operations and/or perform other functions such that the secured MCED may validate participation by the management controller.

The method may end following operation 310.

Using the method illustrated in FIG. 3A, embodiments disclosed herein may provide a data processing system that presents a unified management interface. The unified management interface may be implemented by enabling management controllers of the data processing system to obtain super-user access to the secured MCEDs.

In the event that the secured MCED is moved to another data processing system, the management certificate may be provided to a different management controller of the other data processing system thereby allowing the secured MCED to be unsecured and then resecured.

However, to do so, the MCED may initially be obtain in an unsecured condition in which default user credentials are available to the management controller. If a MCED is initially obtained in a secured condition where default credentials are unavailable, a similar process may be performed but using a certificate established in a factory setting when the MCED is constructed and initially configured for operation.

Turning to FIG. 3B, a flow diagram illustrating a method of managing MCEDs in accordance with an embodiment is shown. The method may be performed by any of data processing systems 100, management controller 102, management system 106, and/or other components of the system shown in FIG. 1.

Prior to operation 320, a MCED may have been programmed or otherwise configured with super root user credentials. Consequently, when received by a data processing system, the MCED may be secured.

At operation 320, presence of a secured MCED in a data processing system is identified. The presence may be identified by a management controller of the data processing system. The presence may be identified by (i) performing a discovery process for devices hosted by the data processing system, (ii) by receiving information regarding the presence from the host data processing system, (iii) by reading information regarding the presence from the host data processing system from storage (e.g., such as a data structure which includes information regarding devices hosted by the data processing system), and/or via other methods.

The discovery process may include, for example, attempting to communicate with other devices hosted by the data processing system via one or more communication channels (e.g., such as a data bus through which devices of the data processing system may communicate with one another, and/or via specialized management communication channels such as out of band channels).

At operation 322, super root user access for the secured MCED is reset using a factory certificate to obtain an unsecured MCED. The super root user access may be reset by (i) providing the factory certificate to the secured MCED, and (ii) invoking reset functionality of the secured MCED. So long as the factory certificate may be validated, the secured MCED may reset the super root user access such that the management controller may gain access to the now unsecured MCED.

Prior to resetting the super root user access, the factory certificate may be used to validate that the factory certificate may be used to reset the super root user credentials. For example, the factory certificate may specify an inventory for the device that hosts the MCED. The inventory may be compared to actual components of the device.

At operation 324, super root user credentials for the unsecured MCED are configured. The management controller may configure the super root user credentials using the unsecured MCED (e.g., using reset credentials to gain some level of user access). The super root user credentials may be configured by (i) invoking a configuration function of the unsecured MCED and (ii) specifying, to the unsecured MCED, the super root user credentials. The super root user credentials may include, for example, an identifier of the super root user, access credentials such as passwords, and/or other types of information that may allow the unsecured MCED to discriminate entities entitled to super root user access from other entities.

At operation 326, the unsecured MCED is secured to obtain a resecured MCED. The unsecured MCED may be resecured by the management controller and using the super root user access. For example, some functionalities of the unsecured MCED may be restricted to different types of users. These functionalities may include, for example, presentation of the MCED in a network environment, user account modification, etc. The unsecured MCED may be secured by (i) invoking configuration functionality of the MCED using the super root user access to modify presentation of the MCED in the network environment such that the MCED is only visible to the management controller (e.g., may stop presenting itself as a different endpoint and/or may stop advertising the endpoint), (ii) invoking configuration functionality of the MCED to limit access to the MCED except for the super root user access, and/or perform other configurations to limit access to the MCED.

At operation 318, a delta certificate for the resecured MCED is obtained. The delta certificate may be usable to unsecure the resecured MCED. For example, the delta certificate may include an identifier and access credentials for the super root user access. Consequently, a different entity may gain super root user access to the resecured MCED using the credentials (e.g., identifier, password, etc.) included in the delta certificate.

The delta certificate may be exported from the management controller for storage in other locations (e.g., a cloud storage, management system 106, a repository/locker, etc.). Consequently, other entities may retrieve the copy of the delta certificate and use the delta certificate to gain super root user access to the resecured MCED (e.g., if moved to another host data processing system).

At operation 320, operation of the secured MCED is managed. The operation may be managed by (i) obtaining management operations for the resecured MCED (e.g., from a management system that may manage the host data processing system, the secured MCED, and/or other devices), (ii) identifying that the management operations are for the secured MCED and/or validating the management operations (e.g., the management controller may implement a security model through which it may validate operations for the secured MCED prior to issuing them to the secured MCED) by discriminating them from other management operations directed to the host data processing system and/or other devices (e.g., the management controller may serve as a unified management entity for the data processing system and hosted devices), (iii) issuing the management operations to the secured MCED, (iv) obtaining information from the secured MCED such as telemetry data, communications, etc., (v) providing all, a portion, or other information derived from the information to other entities, and/or performing other actions to facilitate management of the secured MCED.

The management operations may, for example, cause the secured MCED to modify its operation, provide information, etc.

When issuing the management operations to the MCED, the management controller may do so using the super root user access. For example, the management controller may sign the management operations and/or perform other functions such that the secured MCED may validate participation by the management controller.

The method may end following operation 320.

Using the method shown in FIG. 3B, any number of MCEDs may be managed even when default credentials are unavailable to establish super root user access.

Figure 4:
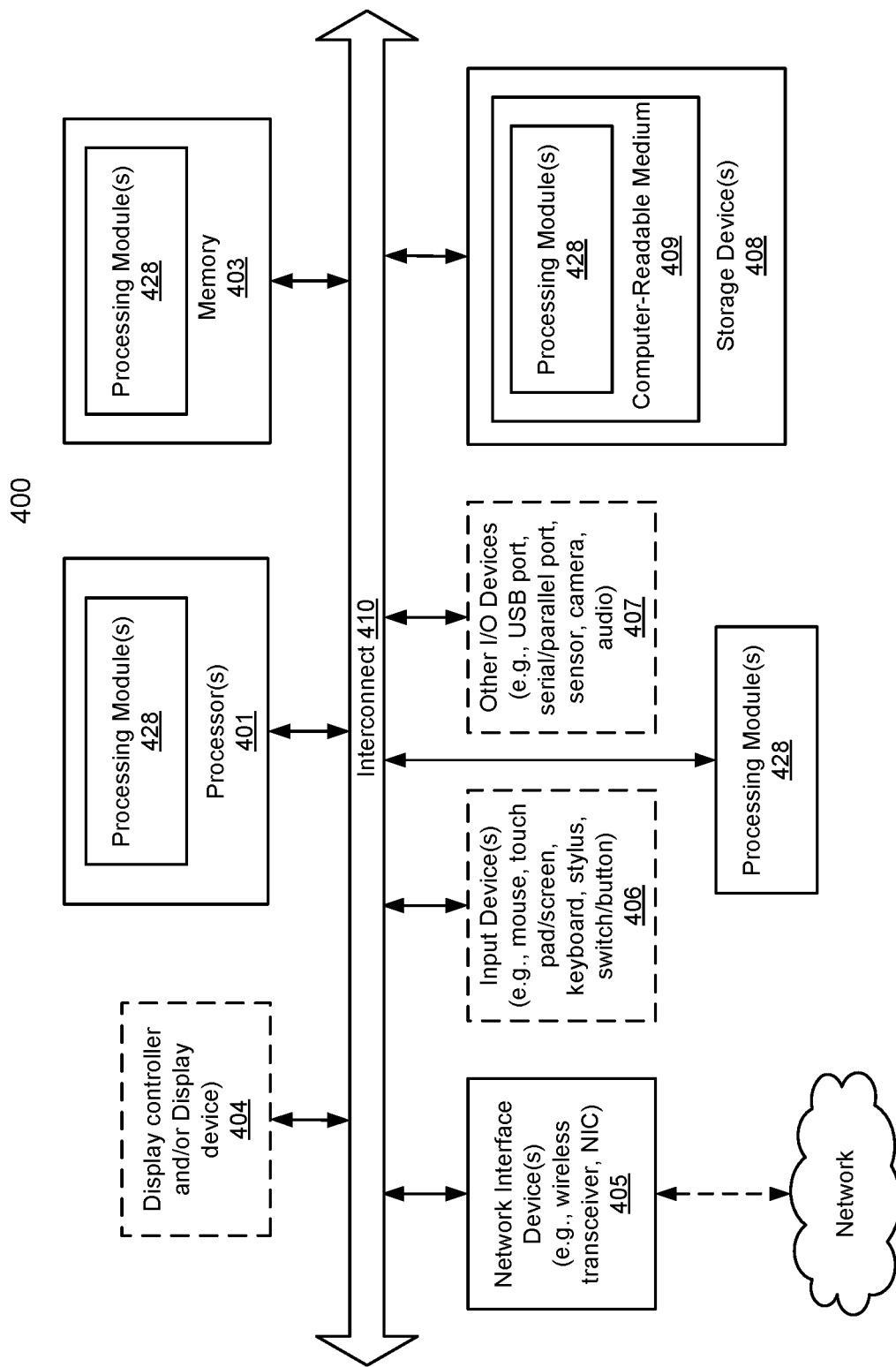
FIG. 4 shows a block diagram illustrating a data processing system in accordance with an embodiment.

Any of the components illustrated in FIGS. 1-2F may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing management controller embedded devices (MCEDs) hosted by a data processing system, the method comprising:
   identifying, by a management controller of the data processing system, presence of an unsecured MCED of the MCEDs;
   gaining, by the management controller, user access to the unsecured MCED using default credentials for a type of the unsecured MCED;
   configuring, by the management controller and using the user access, super root user credentials for the unsecured MCED;
   securing, by the management controller and using super root user access to the unsecured MCED, the unsecured MCED to obtain a secured MCED; and
   obtaining, by the management controller and using the super root user credentials, a management certificate for the secured MCED usable to unsecure the secured MCED.

2. The method of claim 1, further comprising:
   storing, by the management controller, a copy of the management certificate in a management system remote to the data processing system.

3. The method of claim 2, further comprising:
   obtaining, by the management controller, a management operation for the secured MCED; and
   initiating, by the management controller and using the super root user credentials, performance of the management operation by the secured MCED.

4. The method of claim 3, further comprising:
   identifying, by the management controller, presence of a second secured MCED of the MCEDs;
   obtaining, by the management controller and from the management system, a second management certificate;
   unsecuring, by the management controller and using the second management certificate, the second secured MCED to obtain a second unsecured MCED;
   gaining, by the management controller, second user access to the second unsecured MCED using second default credentials for a type of the second unsecured MCED;
   configuring, by the management controller and using the second user access, second super root user credentials for the second unsecured MCED;
   securing, by the management controller and using second super root user access, the second unsecured MCED to obtain a second resecured MCED; and
   obtaining, by the management controller and using the second super root user credentials, a third management certificate for the second resecured MCED usable to unsecure the second resecured MCED.

5. The method of claim 4, wherein the management certificate comprises a service tag for the management controller and a service tag for the secured MCED.

6. The method of claim 5, wherein the management certificate indicates that the management controller has the super root user access to the secured MCED.

7. The method of claim 6, wherein the management certificate is cryptographically verifiable and is signed by a trusted entity.

8. The method of claim 7, wherein securing the unsecured MCED comprises:
   disabling out-of-band management channels of the unsecured MCED; and
   retaining a management channel between the management controller and the unsecured MCED.

9. A non-transitory machine-readable medium having instructions stored therein, which when executed by a processor, cause the processor to perform operations for managing management controller embedded devices (MCEDs) hosted by a data processing system, the operations comprising:
   identifying, by a management controller of the data processing system, presence of an unsecured MCED of the MCEDs;
   gaining, by the management controller, user access to the unsecured MCED using default credentials for a type of the unsecured MCED;
   configuring, by the management controller and using the user access, super root user credentials for the unsecured MCED;
   securing, by the management controller and using super root user access to the unsecured MCED, the unsecured MCED to obtain a secured MCED; and
   obtaining, by the management controller and using the super root user credentials, a management certificate for the secured MCED usable to unsecure the secured MCED.

10. The non-transitory machine-readable medium of claim 9, wherein the operations further comprise:
    storing, by the management controller, a copy of the management certificate in a management system remote to the data processing system.

11. The non-transitory machine-readable medium of claim 10, wherein the operations further comprise:
    obtaining, by the management controller, a management operation for the secured MCED; and
    initiating, by the management controller and using the super root user credentials, performance of the management operation by the secured MCED.

12. The non-transitory machine-readable medium of claim 11, wherein the operations further comprise:
    identifying, by the management controller, presence of a second secured MCED of the MCEDs;
    obtaining, by the management controller and from the management system, a second management certificate;
    unsecuring, by the management controller and using the second management certificate, the second secured MCED to obtain a second unsecured MCED;
    gaining, by the management controller, second user access to the second unsecured MCED using second default credentials for a type of the second unsecured MCED;
    configuring, by the management controller and using the second user access, second super root user credentials for the second unsecured MCED;
    securing, by the management controller and using second super root user access, the second unsecured MCED to obtain a second resecured MCED; and
    obtaining, by the management controller and using the second super root user credentials, a third management certificate for the second resecured MCED usable to unsecure the second resecured MCED.

13. The non-transitory machine-readable medium of claim 12, wherein the management certificate comprises a service tag for the management controller and a service tag for the secured MCED.

14. The non-transitory machine-readable medium of claim 13, wherein the management certificate indicates that the management controller has the super root user access to the secured MCED.

15. The non-transitory machine-readable medium of claim 14, wherein the management certificate is cryptographically verifiable and is signed by a trusted entity.

16. The non-transitory machine-readable medium of claim 15, wherein securing the unsecured MCED comprises:
    disabling out-of-band management channels of the unsecured MCED; and
    retaining a management channel between the management controller and the unsecured MCED.

17. A data processing system, comprising:
    management controller embedded devices (MCEDs); and
    a management controller comprising:
        a processor; and
        a memory coupled to the processor to store instructions, which when executed by the processor, cause the processor to perform operations for managing the MCEDs, the operations comprising:
            identifying, by a management controller of the data processing system, presence of an unsecured MCED of the MCEDs;
            gaining, by the management controller, user access to the unsecured MCED using default credentials for a type of the unsecured MCED;
            configuring, by the management controller and using the user access, super root user credentials for the unsecured MCED;
            securing, by the management controller and using super root user access to the unsecured MCED, the unsecured MCED to obtain a secured MCED; and
            obtaining, by the management controller and using the super root user credentials, a management certificate for the secured MCED usable to unsecure the secured MCED.

18. The data processing system of claim 17, wherein the operations further comprise:
    storing, by the management controller, a copy of the management certificate in a management system remote to the data processing system.

19. The data processing system of claim 18, wherein the operations further comprise:
    obtaining, by the management controller, a management operation for the secured MCED; and
    initiating, by the management controller and using the super root user credentials, performance of the management operation by the secured MCED.

20. The data processing system of claim 19, wherein the operations further comprise:
    identifying, by the management controller, presence of a second secured MCED of the MCEDs;
    obtaining, by the management controller and from the management system, a second management certificate;
    unsecuring, by the management controller and using the second management certificate, the second secured MCED to obtain a second unsecured MCED;
    gaining, by the management controller, second user access to the second unsecured MCED using second default credentials for a type of the second unsecured MCED;
    configuring, by the management controller and using the second user access, second super root user credentials for the second unsecured MCED;
    securing, by the management controller and using second super root user access, the second unsecured MCED to obtain a second resecured MCED; and
    obtaining, by the management controller and using the second super root user credentials, a third management certificate for the second resecured MCED usable to unsecure the second resecured MCED.

* * * * *